(12) United States Patent
Highstrom

(10) Patent No.: US 8,686,829 B2
(45) Date of Patent: Apr. 1, 2014

(54) LOCK CODE RECOVERY SYSTEM

(75) Inventor: Matthew M. Highstrom, South Lyon, MI (US)

(73) Assignee: GM Global Technology Operations LLC, Detroit, MI (US)

(*) Notice: Subject to any disclaimer, the term of this patent is extended or adjusted under 35 U.S.C. 154(b) by 286 days.

(21) Appl. No.: 13/157,682

(22) Filed: Jun. 10, 2011

(65) Prior Publication Data

US 2012/0315873 A1 Dec. 13, 2012

(51) Int. Cl.
*G05B 23/00* (2006.01)

(52) U.S. Cl.
USPC ... 340/5.1; 340/5.61; 340/539.11; 455/569.2; 705/39; 705/65; 713/183; 713/186; 726/17; 726/18; 726/6

(58) Field of Classification Search
USPC ............ 340/5.61, 539.11, 870.01; 455/569.2; 713/183, 186; 726/6, 17, 18
See application file for complete search history.

(56) References Cited

U.S. PATENT DOCUMENTS

| | | | |
|---|---|---|---|
| 7,725,730 B2* | 5/2010 | Juels et al. | 713/183 |
| 7,778,186 B2* | 8/2010 | Oman et al. | 340/5.61 |
| 8,053,922 B2 | 11/2011 | Muller | |
| 8,346,310 B2* | 1/2013 | Boll et al. | 455/569.2 |
| 2004/0133812 A1* | 7/2004 | Ohmori et al. | 713/202 |
| 2005/0071646 A1* | 3/2005 | Hollingshead | 713/186 |
| 2006/0085847 A1* | 4/2006 | Ikeuchi et al. | 726/6 |
| 2008/0140574 A1* | 6/2008 | Boucher et al. | 705/65 |
| 2008/0235132 A1* | 9/2008 | Banatre et al. | 705/39 |
| 2010/0321203 A1* | 12/2010 | Tieman et al. | 340/870.01 |
| 2011/0080282 A1* | 4/2011 | Kleve et al. | 340/539.11 |
| 2012/0185933 A1* | 7/2012 | Belk et al. | 726/17 |
| 2012/0268242 A1* | 10/2012 | Tieman et al. | 340/5.61 |

FOREIGN PATENT DOCUMENTS

| | | |
|---|---|---|
| DE | 10031384 A1 | 1/2002 |
| DE | 10064546 C1 | 7/2002 |
| DE | 10304243 A1 | 8/2004 |
| EP | 1191486 A1 | 3/2002 |
| EP | 2228270 A1 | 9/2010 |

OTHER PUBLICATIONS

German Office Action for Application No. 102012209466.0 dated Mar. 19, 2013; 4 pages.

* cited by examiner

*Primary Examiner* — Daniel Wu
*Assistant Examiner* — Israel Daramola
(74) *Attorney, Agent, or Firm* — Cantor Colburn LLP

(57) ABSTRACT

A lock code recovery system for selectively sending a lock code to a proximate personal electronic device is provided. A recognizable code is associated with the proximate personal electronic device. The lock code recovery system includes a user input device for receiving feedback and a control module. The control module is in communication with the user input device, and has a memory with an application and at least one recognizable code stored thereon. The application has the lock code associated with the application for at least activating or deactivating the application. The control module includes control logic for monitoring the user input device for feedback indicating the lock code associated with the application should be sent to the proximate personal device.

20 Claims, 1 Drawing Sheet

LOCK CODE RECOVERY SYSTEM

FIELD OF THE INVENTION

Exemplary embodiments of the invention relate to a lock code recovery system and, more particularly, to a lock code recovery system for selectively sending a lock code to a proximate personal electronic device.

BACKGROUND

Some types of vehicle applications require a pass code or lock code to activate and deactivate the application. Some of these applications restrict access to certain vehicle systems. For example, a valet application usually restricts access to certain vehicle functions as well as certain storage areas of the vehicle. Specifically, the valet application makes certain functions such as, for example, the personal addresses stored on the vehicle's navigation system unavailable. In one example, the valet code may also lock out upper speed or power ranges of a high-performance vehicle. That is, a valet code could limit power of an engine to about 150-200 horsepower, but when the valet code is deactivated the power of the engine could be about 375 horsepower. The valet application also restricts access to lockable storage areas (e.g. the glove box and trunk of the vehicle). Access to these vehicle functions and storage areas are denied until the lock code is entered to deactivate the valet application. Another example of a vehicle application that requires a lock code is a teen driver application, which usually performs functions such as limiting the sound volume of the audio system and vehicle speed.

Sometimes a user may forget the lock code. If this happens, then the user typically has to visit an authorized dealership to release the lock code and deactivate the valet application. However, visiting a dealership may be inconvenient and causes embarrassment to a user. Moreover, a visit to the dealership is costly. Accordingly, it is desirable to provide a convenient and cost-effective approach for recovering a lock code.

SUMMARY OF THE INVENTION

In one exemplary embodiment of the invention, a lock code recovery system for selectively sending a lock code to a proximate personal electronic device is provided. A recognizable code is associated with the proximate personal electronic device. The lock code recovery system includes a user input device for receiving feedback and a control module. The control module is in communication with the user input device, and has a memory with an application and at least one recognizable code stored thereon. The application has the lock code associated with the application for at least activating or deactivating the application. The control module includes control logic for monitoring the user input device for feedback indicating the lock code associated with the application should be sent to the proximate personal device. The control module includes control logic for detecting the recognizable code associated with the proximate personal electronic device over a short-range wireless network. The control module includes control logic for comparing the at least one recognizable code stored in the memory of the control module with the recognizable code associated with the proximate personal electronic device. The control module includes control logic for determining if the at least one recognizable code stored in the memory of the control module is identical to the recognizable code associated with the proximate personal electronic device. The control module includes control logic for establishing a short-range wireless connection between the proximate personal electronic device and the control module. The control module includes control logic for sending a signal indicating the lock code to the proximate personal device over the short-range wireless connection if the at least one recognizable code stored in the memory of the control module is identical to the recognizable code associated with the proximate personal electronic device.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
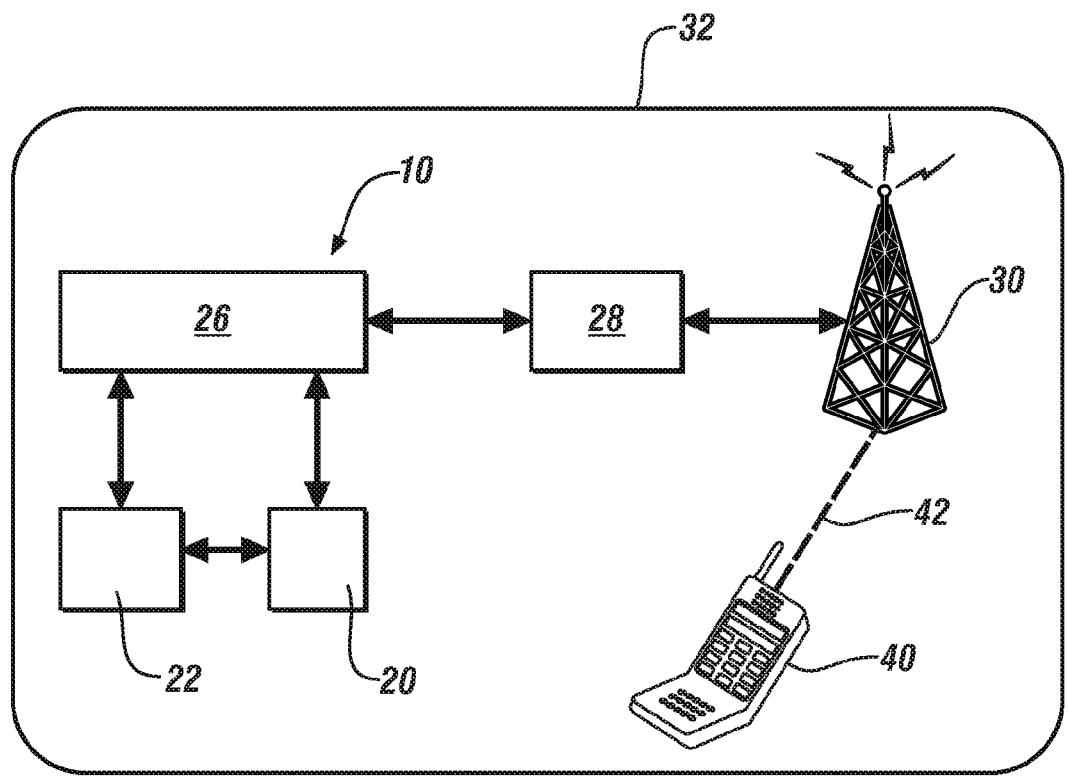
FIG. 1 is a schematic diagram of an exemplary lock code recovery system in a vehicle.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to a lock code recovery system 10. The lock code recovery system 10 includes a user input 20, a display 22, a control module 26, a transceiver 28, and an antenna 30. The lock code recovery system 10 is in selective wireless communication with a proximate personal electronic device 40. Specifically, the control module 26 is in selective communication with the proximate personal electronic device 40 through the transceiver 28 and the antenna 30 by a short-range wireless connection 42. The short range wireless connection 42 is typically any type of wireless signal for exchanging data over distances typically under about 10 meters. In one example, the short-range wireless connection may be a Bluetooth® signal conforming to IEEE Standard 802.15 or a Wi-Fi® signal conforming to IEEE standard 802.11. In the embodiment as shown in FIG. 1, the lock code recovery system 10 is employed in a vehicle 32. However it is to be understood that the lock code recovery system 10 may be employed in any variety of applications such as, for example, a computer having a password/locking system and a smartphone that are in short range wireless communication with one another. In another example, a home security system and a smartphone that are in short range wireless communication with one another could also employ the lock code recovery system 10.

The proximate personal electronic device 40 is situated within proximity of the antenna 30 such that the proximate personal electronic device 40 has the ability to be in short-range wireless communication therewith. That is, the proximate personal electronic device 40 is usually situated within about 10 meters from the antenna 30. The proximate personal electronic device 40 is typically any type of portable electronic device associated with or having a recognizable code. For example, the recognizable code may be the device address of the proximate personal electronic device 40. Specifically, in one embodiment utilizing Bluetooth® as the short-range wireless connection 42, the recognizable code is the Bluetooth® device address. The proximate personal electronic device 40 also has text communication service capabilities for receiving text messages such as, for example, Short Message Service ("SMS") messages. For example, in one embodiment, the proximate personal electronic device 40 could be a smartphone.

Figure 2:
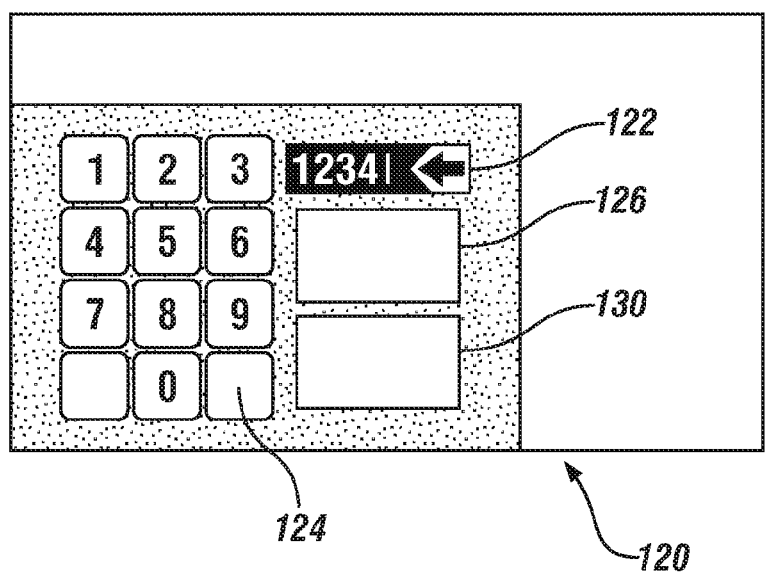
FIG. 2 is an exemplary illustration of a display of the lock code recovery system as shown in FIG. 1.

The user input 20 typically includes a keypad or a keyboard for allowing a user to input information. In one embodiment, the display 22 is a liquid crystal display ("LCD") screen, and is used to display graphics and text. In the embodiment as shown in FIG. 2, the user input 20 and the display 22 are a combined unit, where the display is a touchscreen that detects the presence and location of a user's touch. Turning back to FIG. 1, the control module 26 is in communication with the user input 20, the display 22, the transceiver 28 and the antenna 30. Although FIG. 1 illustrates the transceiver 28 and the antenna 30 as separate components from the control module 26, it is to be understood that the transceiver 28 and the antenna 30 could also be integrated with the control module 26 as well. The control module 26 is typically any type of control module that controls one or more of the electrical systems or subsystems of the vehicle 32. For example, in one embodiment the control module 26 is an infotainment control module.

The control module 26 includes a memory for storing at least one application. A lock code is associated with the application. Specifically, the application has a lock code that activates, deactivates, or activates and deactivates the application. For example, in one embodiment, the application is a valet application that restricts access to certain vehicle functions as well as certain storage areas of the vehicle 32. The valet code may also lock out upper speed or power ranges of a vehicle. For example, a valet code could limit power of an engine to about 150-200 horsepower, but when the valet code is deactivated the power of the engine could be about 375 horsepower. Another example of a vehicle application that requires a lock code is a teen driver application, which usually performs functions such as limiting the sound volume of the audio system and vehicle speed. In yet another embodiment, the application is an Internet based application such as, for example, a Facebook account. The lock code is typically a numeric or alphanumeric code that the user enters by manipulating the user input 20. In one exemplary embodiment, the lock code is a four digit number.

The memory of the control module 26 also stores at least one recognizable code of a personal electronic device. Specifically, the control module 26 stores the recognizable code of a personal electronic device that has previously established short-range wireless communication with the control module 26. For example, if the short-range wireless connection is a Bluetooth® connection, then the control module 26 and the personal electronic device have been paired together in the past. In one exemplary embodiment, the control module 26 could store the recognizable codes of the last ten personal electronic devices that have been in short-range wireless communication with the control module 26. Alternatively, the memory of the control module could also store the recognizable code of only the last connected personal electronic device as well.

The lock code recovery system 10 selectively sends the lock code to the proximate personal electronic device 40. Specifically, in the event that a user forgets the lock code, the lock code recovery system 10 may send the lock code to the proximate personal electronic device 40. Turning now to FIG. 2, an integrated display and user input 120 is shown executing an exemplary application. The application employs a lock code, where the lock code is entered into a field 122 for the application to be deactivated. The display and user input 120 includes a keypad 124, an unlock button 126 for unlocking the lock code to deactivate the application, and a forgot button 130 that is selected in the event that a user forgets the lock code.

Referring now to FIGS. 1-2, the control module 26 includes control logic for monitoring the user input device for feedback indicating that the lock code associated with the application is forgotten, and that the lock code should be sent to the proximate personal electronic device 40. Specifically, the control module 26 includes control logic for monitoring the integrated display and user input 120 for feedback indicating that a user has selected the forgot button 130. Once the forgot button 130 is selected, the control module 26 includes control logic for searching over the short-range wireless network for personal electronic devices that are within range, which is typically about 10 meters. The control module 26 includes control logic for detecting the presence of the personal electronic devices that are within the short-range wireless network. Specifically, the control module 26 includes control logic for detecting the presence of the proximate personal electronic device 40. The control module 26 also includes control logic for detecting the recognizable code that is associated with the proximate personal electronic device 40.

The control module 26 further includes control logic for comparing the recognizable code that is associated with the proximate personal electronic device 40 with the recognizable code or codes that are stored in the memory of the control module 26. In one embodiment, the control module 26 stores the recognizable codes of the last ten personal electronic devices that have been in short-range wireless communication with the control module 26. Alternatively, the control module 26 may only store the recognizable code of the last connected personal electronic device.

The control module 26 also includes control logic for determining if the recognizable code of the proximate personal electronic device 40 is identical to any of the recognizable codes that are stored in the memory of the control module 26. If the recognizable code of the proximate personal electronic device 40 is identical to any of recognizable codes that are stored in the memory of the control module 26, then the short-range wireless connection 42 is established between the proximate personal electronic device 40 and the control module 26. However, if the recognizable code of the proximate personal electronic device 40 is not identical to any of the recognizable codes stored in the memory of the control module 26, then the short-range wireless connection 42 is not established. For example, if the application is a valet application, and if a valet or other unauthorized user tried to deactivate the valet application by selecting the forgot button 130, the control module 26 would determine that the personal electronic device owed by the valet was not stored in the memory of the control module 26. Therefore, a short-range wireless connection 42 would not be established between the valet's personal electronic device and the control module 26.

The control module 26 includes control logic for sending the lock code over the short-range wireless network 42 if the recognizable code of the proximate personal electronic device 40 is identical to any of recognizable codes that are stored in the memory of the control module 26. Specifically, the control module 26 sends the lock code to the proximate personal device 42 as a self-addressed text message such as, for example, a Short Message Service (SMS) message. If a Bluetooth® connection is employed as the short-range wireless connection, then a Message Access Profile (MAP) specification may be employed to define a set of features to exchange messages between the control module 26 and the proximate electronic personal device 40. The MAP specification is one type of Bluetooth® profile that is tailored for use between two devices that exchange messages between one another.

Sending the lock code as a text message to the proximate personal electronic device 40 saves a user a trip to a dealership, where the lock code is released and the valet application is deactivated in the event the lock code is forgotten. Avoiding a trip to the dealership typically saves money, which leads to enhanced customer satisfaction of the vehicle 32. Avoiding a trip to the dealership also spares a user a potentially embarrassing or frustrating situation as well, which may also enhance customer satisfaction of the vehicle 32.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A lock code recovery system for selectively sending a lock code from the lock code recovery system to a proximate personal electronic device, wherein a recognizable code is associated with the proximate personal electronic device and wherein the proximate personal electronic device is a portable electronic device, the lock code recovery system comprising:
    a user input device for receiving feedback; and
    a control module in communication with the user input device, the control module having a memory with an application and at least one recognizable code stored thereon, the application having the lock code associated with the application for at least activating or deactivating the application, the control module comprising:
        a control logic for monitoring the user input device for feedback indicating the lock code associated with the application should be sent to the proximate personal electronic device;
        a control logic for detecting the recognizable code associated with the proximate personal electronic device over a short-range wireless network;
        a control logic for comparing the at least one recognizable code stored in the memory of the control module with the recognizable code associated with the proximate personal electronic device;
        a control logic for determining if the at least one recognizable code stored in the memory of the control module is identical to the recognizable code associated with the proximate personal electronic device;
        a control logic for establishing a short-range wireless connection between the proximate personal electronic device and the control module; and
        a control logic for sending a signal indicating the lock code from the lock code recovery system to the proximate personal electronic device over the short-range wireless connection if the at least one recognizable code stored in the memory of the control module is identical to the recognizable code associated with the proximate personal electronic device.

2. The lock code recovery system of claim 1, further comprising a display in communication with the control module and the user input device.

3. The lock code recovery system of claim 2, wherein the display includes a graphic for indicating whether the lock code associated with the application should be sent to the proximate personal electronic device.

4. The lock code recovery system of claim 1, wherein the signal indicating the lock code is sent as a self-addressed short messaging services (SMS) message.

5. The lock code recovery system of claim 1, wherein a Message Access Profile (MAP) specification defines a set of features to exchange the signal between the control module and the proximate personal electronic device.

6. The lock code recovery system of claim 1, wherein the short-range wireless connection is based on one of the IEEE 802.15 standard and the IEEE 802.11 standard.

7. The lock code recovery system of claim 1, wherein the application is configured to limit a speed or a power range of a vehicle.

8. The lock code recovery system of claim 1, wherein the application is configured to limit a sound volume of an audio system.

9. The lock code recovery system of claim 1, wherein the control module is an infotainment control module.

10. A vehicle having a lock code recovery system for sending a lock code from the lock code recovery system to a proximate personal electronic device, wherein a recognizable code is associated with the proximate personal electronic device and wherein the proximate personal electronic device is a portable electronic device, the lock code recovery system comprising:
    a user input device for receiving feedback; and
    a control module in communication with the user input device, the control module having a memory with an application and at least one recognizable code stored thereon, the application having the lock code associated with the application for at least activating or deactivating the application, the control module comprising:
        a control logic for monitoring the user input device for feedback indicating the lock code associated with the application should be sent to the proximate personal electronic device;
        a control logic for detecting the recognizable code associated with the proximate personal electronic device over a short-range wireless network;
        a control logic for comparing the at least one recognizable code stored in the memory of the control module with the recognizable code associated with the proximate personal electronic device;
        a control logic for determining if the at least one recognizable code stored in the memory of the control module is identical to the recognizable code associated with the proximate personal electronic device;
        a control logic for establishing a short-range wireless connection between the proximate personal electronic device and the control module; and
        a control logic for sending a signal indicating the lock code from the lock code recovery system to the proximate personal electronic device over the short-range wireless connection if the at least one recognizable code stored in the memory of the control module is identical to the recognizable code associated with the proximate personal electronic device.

11. The vehicle of claim 10, further comprising a display in communication with the control module and the user input device.

12. The vehicle of claim 11, wherein the display includes a graphic for indicating whether the lock code associated with the application should be sent to the proximate personal electronic device.

13. The vehicle of claim 10, wherein a Message Access Profile (MAP) specification defines a set of features to exchange the signal between the control module and the proximate electronic personal electronic device.

14. The vehicle of claim 10, wherein the short-range wireless connection is based on one of the IEEE 802.15 standard and the IEEE 802.11 standard.

15. The vehicle of claim 10, wherein the application is configured to restrict access to one or more vehicle functions.

16. The vehicle of claim 10, wherein the signal indicating the lock code is sent as a self-addressed short messaging services (SMS) message.

17. The vehicle of claim 10, wherein the application is configured to limit access to a storage area of a vehicle.

18. A vehicle having a lock code recovery system for sending a lock code to a proximate personal electronic device, wherein a recognizable code is associated with the proximate personal electronic device and wherein the proximate personal electronic device is a portable electronic device, the lock code recovery system comprising:
a user input device for receiving feedback;
a display in communication with the user input device; and
a control module in communication with the user input device and the display, the control module having a memory with a valet application and at least one recognizable code stored thereon, the valet application having the lock code associated with the valet application for at least activating or deactivating the valet application, the control module comprising:
a control logic for monitoring the user input device for feedback indicating the lock code associated with the valet application should be sent to the proximate personal electronic device;
a control logic for detecting the recognizable code associated with the proximate personal electronic device over a short-range wireless network;
a control logic for comparing the at least one recognizable code stored in the memory of the control module with the recognizable code associated with the proximate personal electronic device;
a control logic for determining if the at least one recognizable code stored in the memory of the control module is identical to the recognizable code associated with the proximate personal electronic device;
a control logic for establishing a short-range wireless connection between the proximate personal electronic device and the control module; and
a control logic for sending a self-addressed short messaging services (SMS) signal indicating the lock code from the lock code recovery system to the proximate personal electronic device over the short-range wireless connection if the at least one recognizable code stored in the memory of the control module is identical to the recognizable code associated with the proximate personal electronic device.

19. The vehicle of claim 18, wherein a Message Access Profile (MAP) specification defines a set of features to exchange the signal between the control module and the proximate personal electronic device.

20. The vehicle of claim 18, wherein the short-range wireless connection is based on one of the IEEE 802.15 standard and the IEEE 802.11 standard.

* * * * *